Jan. 7, 1964 W. G. YOUNG ETAL 3,116,914
CONTINUOUS MINING MACHINE HAVING A SINGLE ADJUSTABLE CONVEYOR
Original Filed March 5, 1957 13 Sheets-Sheet 1
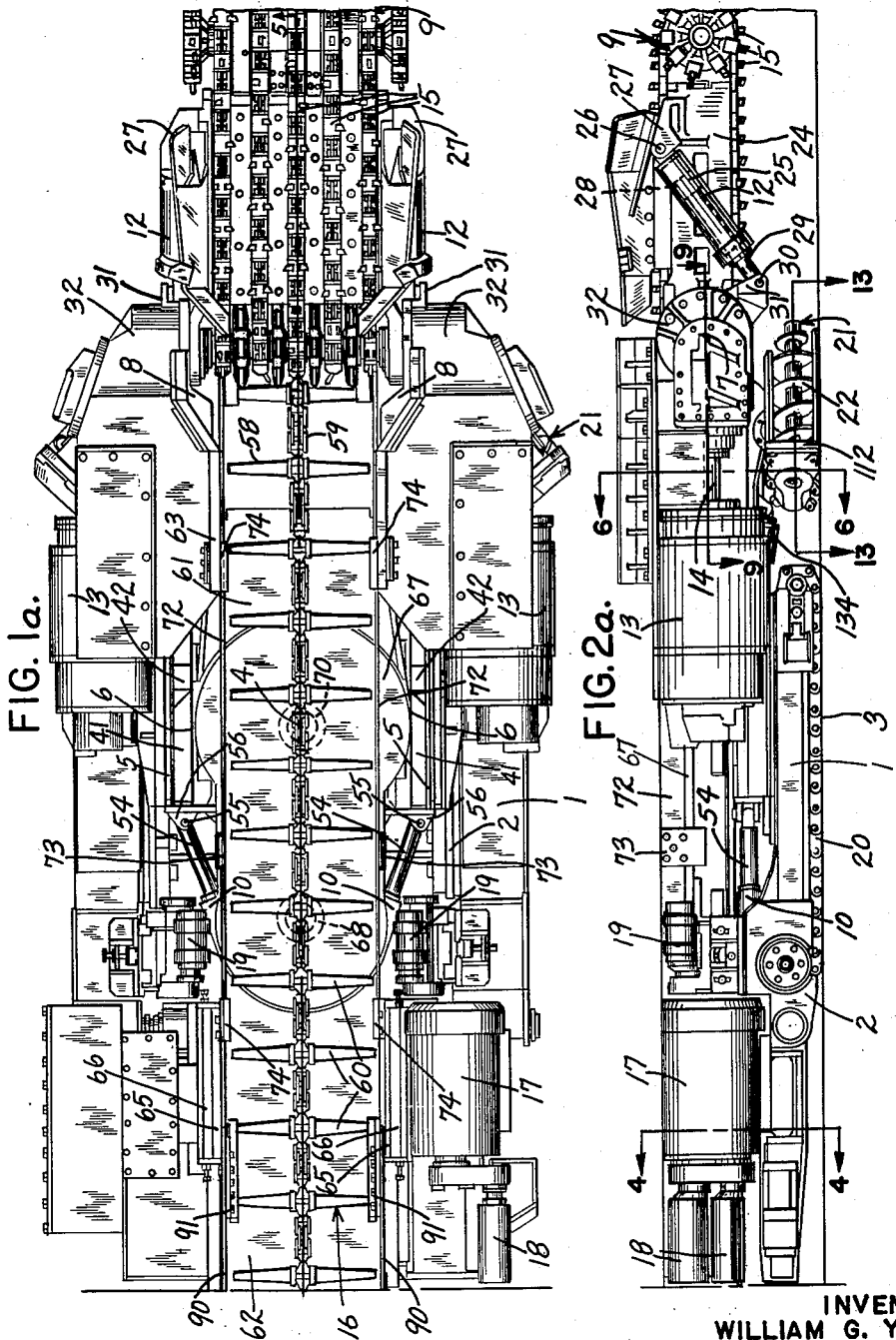
INVENTORS:
WILLIAM G. YOUNG
CHARLES W. FITZGERALD
KENTON E. McELHATTAN
BY Charles F. Osgood,
ATTORNEY

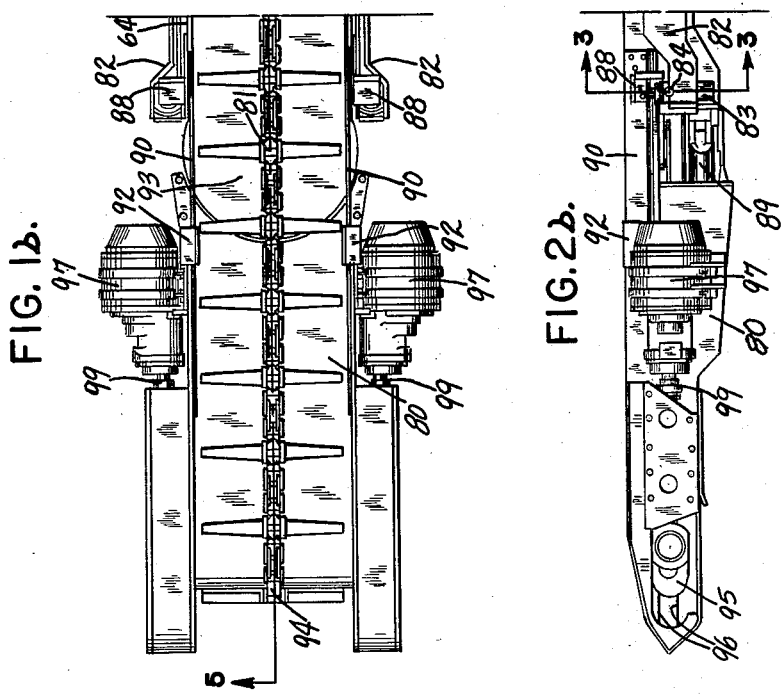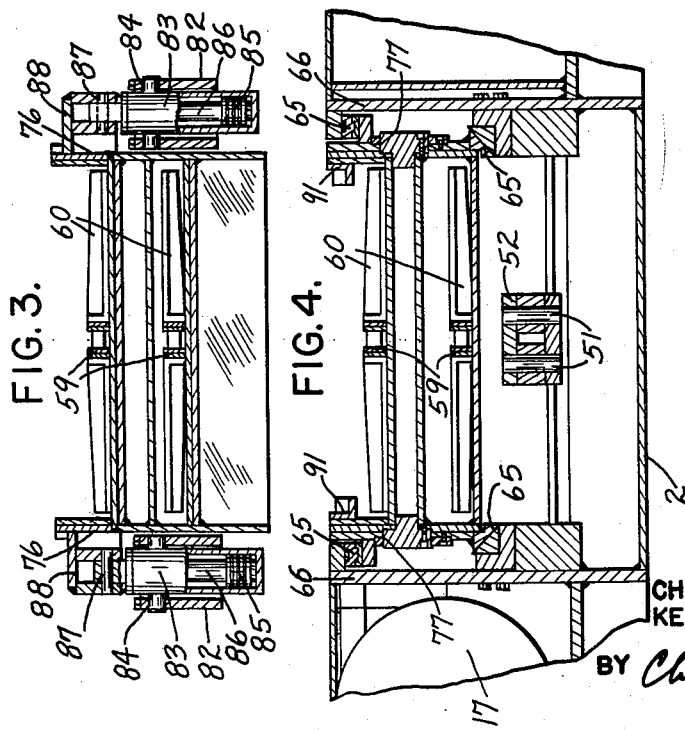
INVENTORS:
WILLIAM G. YOUNG
CHARLES W. FITZGERALD
KENTON E. McELHATTAN
BY Charles F. Osgood,
ATTORNEY Jan. 7, 1964   W. G. YOUNG ETAL   3,116,914
CONTINUOUS MINING MACHINE HAVING A SINGLE ADJUSTABLE CONVEYOR
Original Filed March 5, 1957   13 Sheets-Sheet 3

INVENTORS:
WILLIAM G. YOUNG
CHARLES W. FITZGERALD
KENTON E. McELHATTAN

BY Charles F. Osgood,

ATTORNEY

Jan. 7, 1964 W. G. YOUNG ETAL 3,116,914
CONTINUOUS MINING MACHINE HAVING A SINGLE ADJUSTABLE CONVEYOR
Original Filed March 5, 1957 13 Sheets-Sheet 4
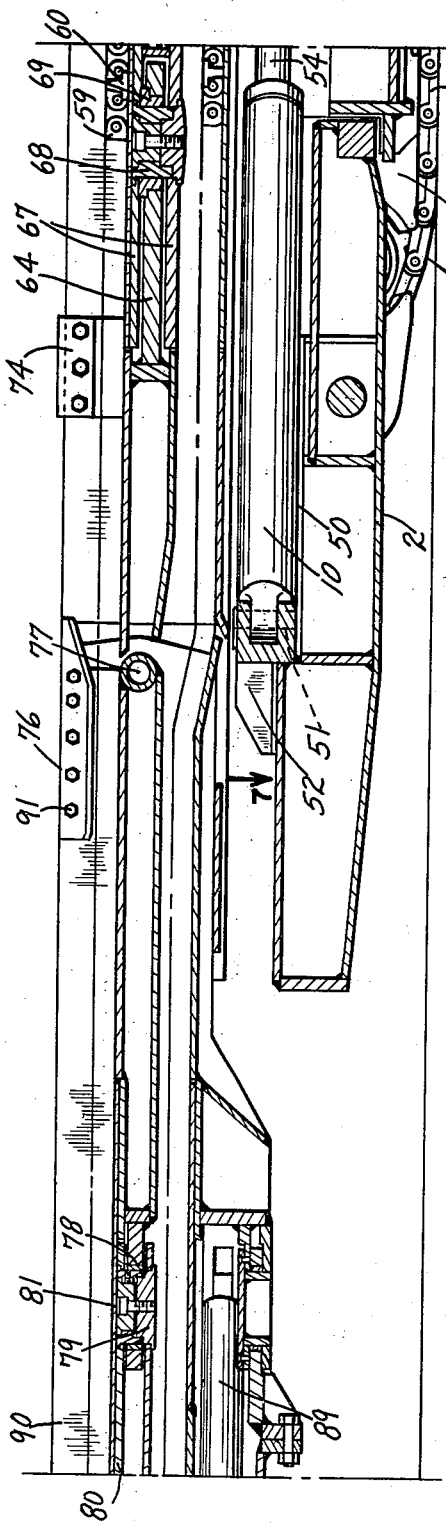
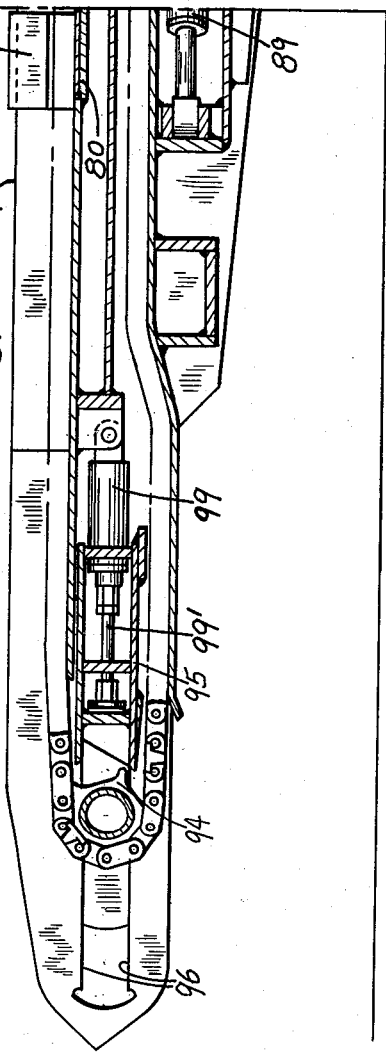
INVENTORS:
WILLIAM G. YOUNG
CHARLES W. FITZGERALD
KENTON E. McELHATTAN
BY Charles F. Osgood,
ATTORNEY

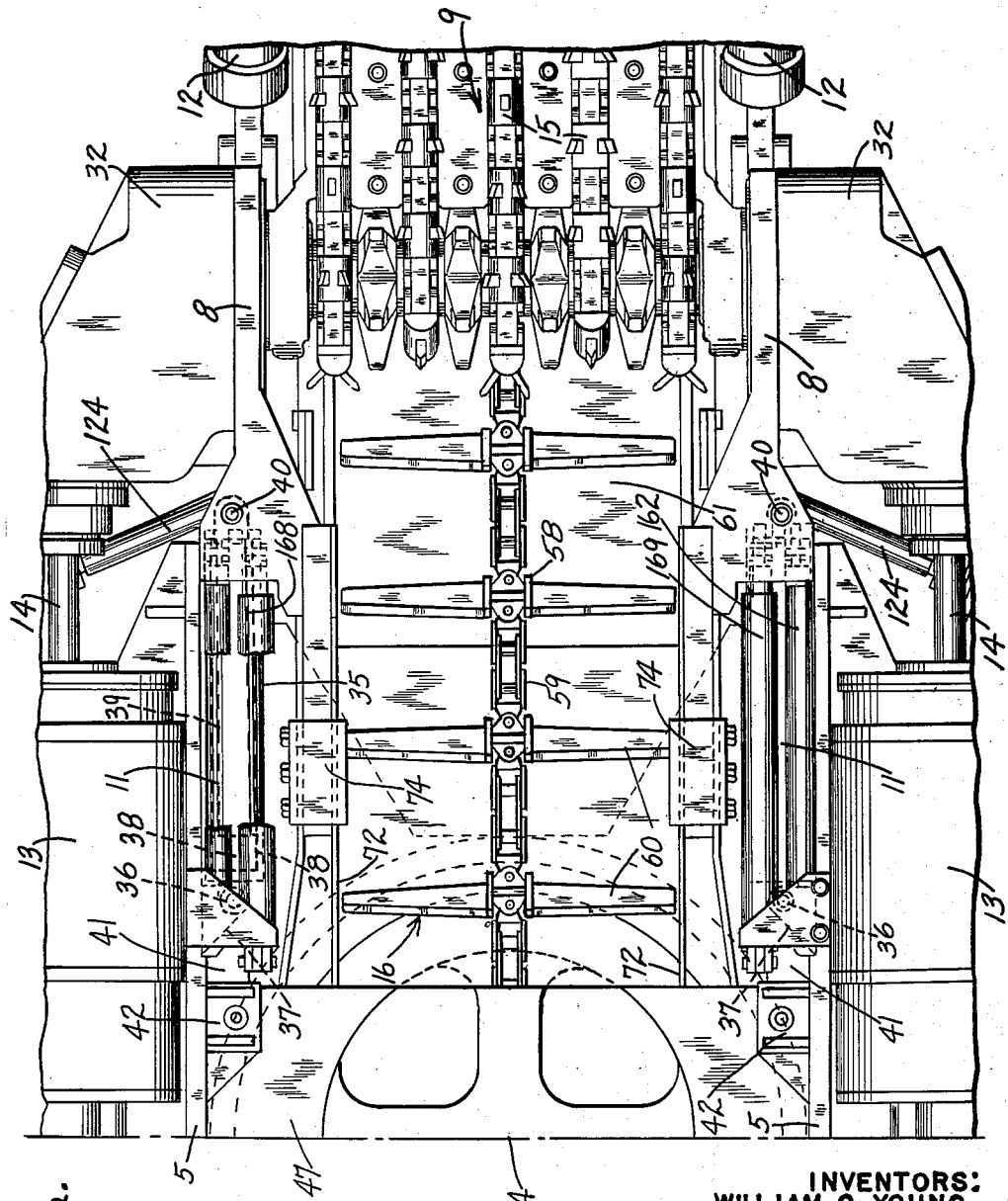

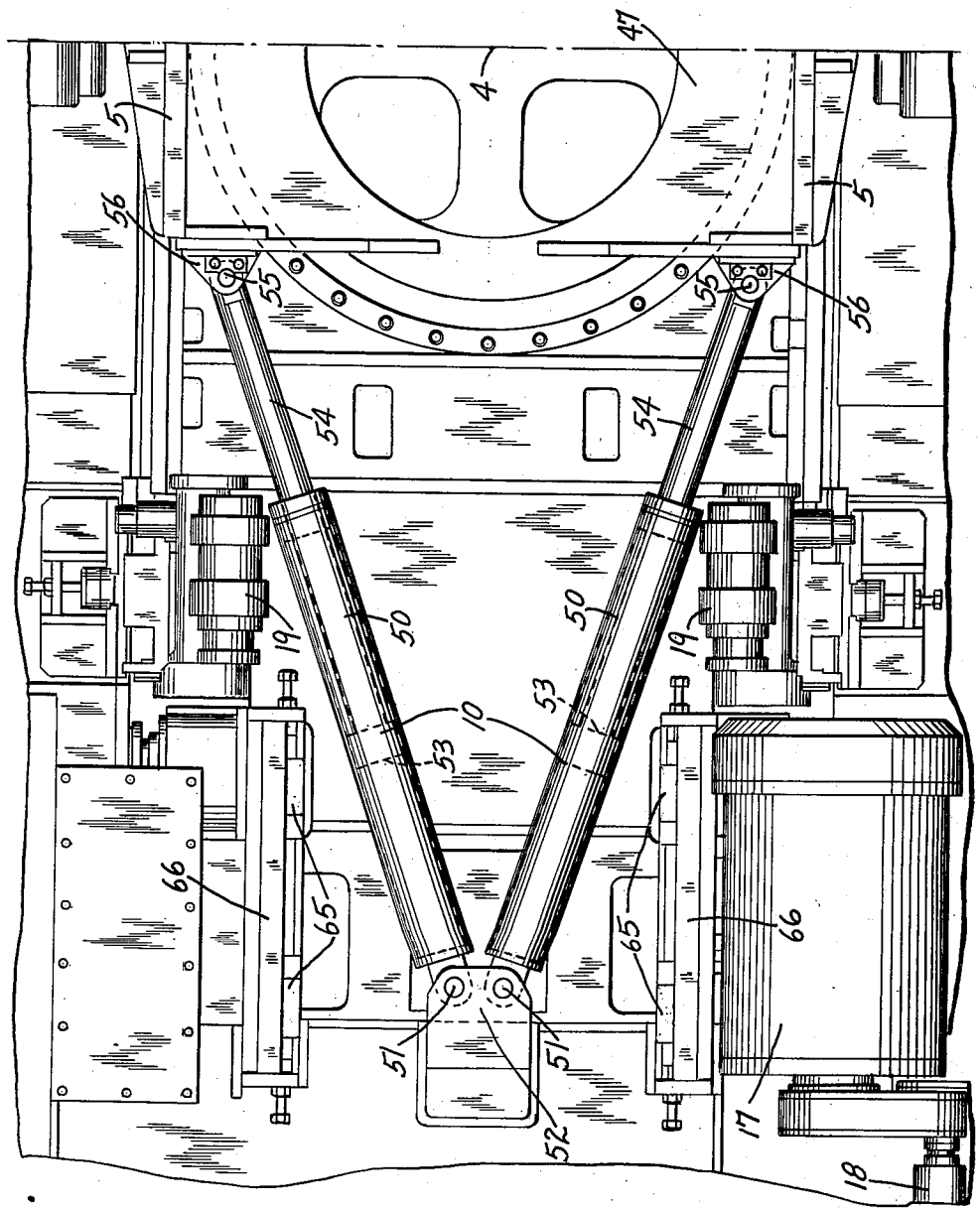

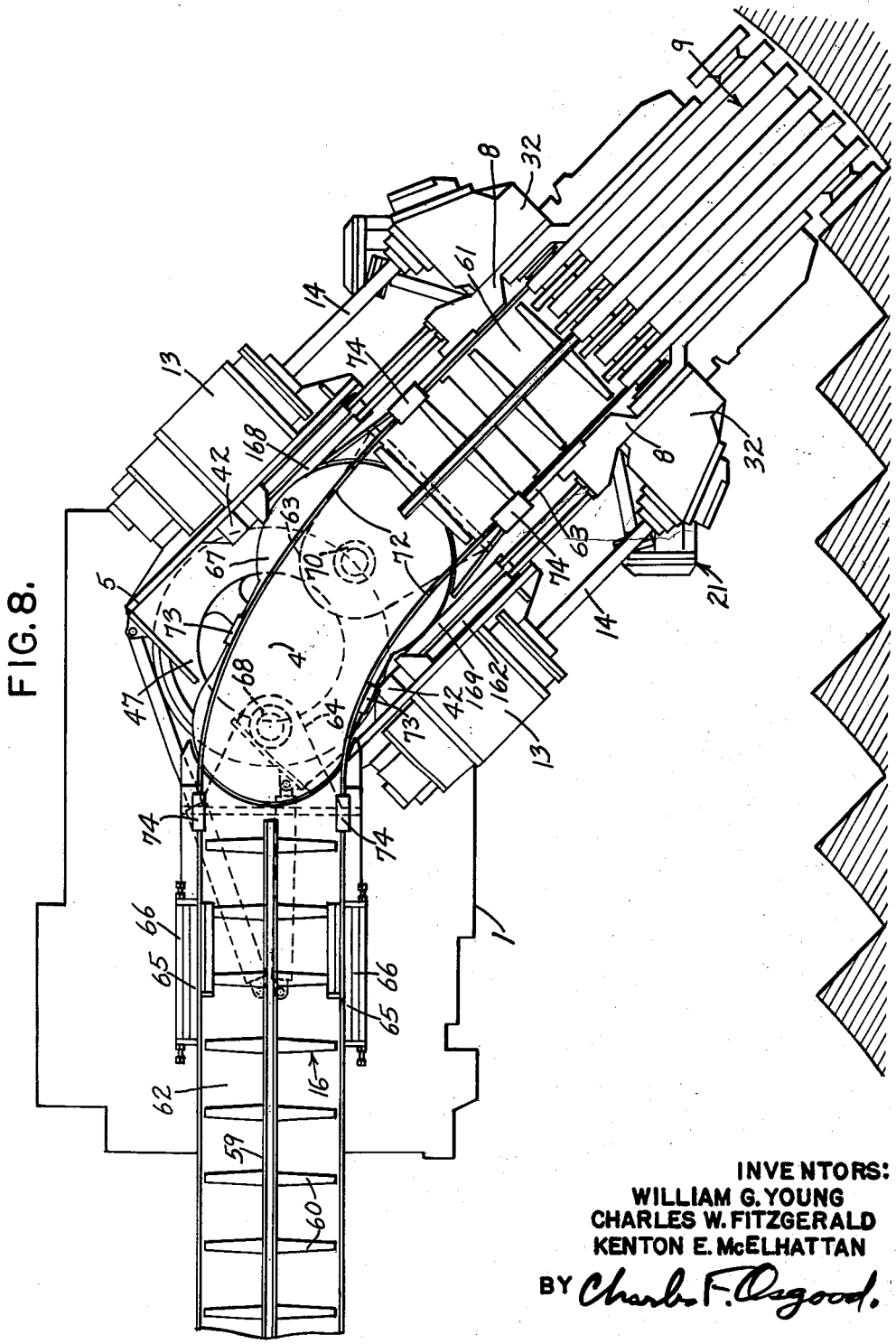

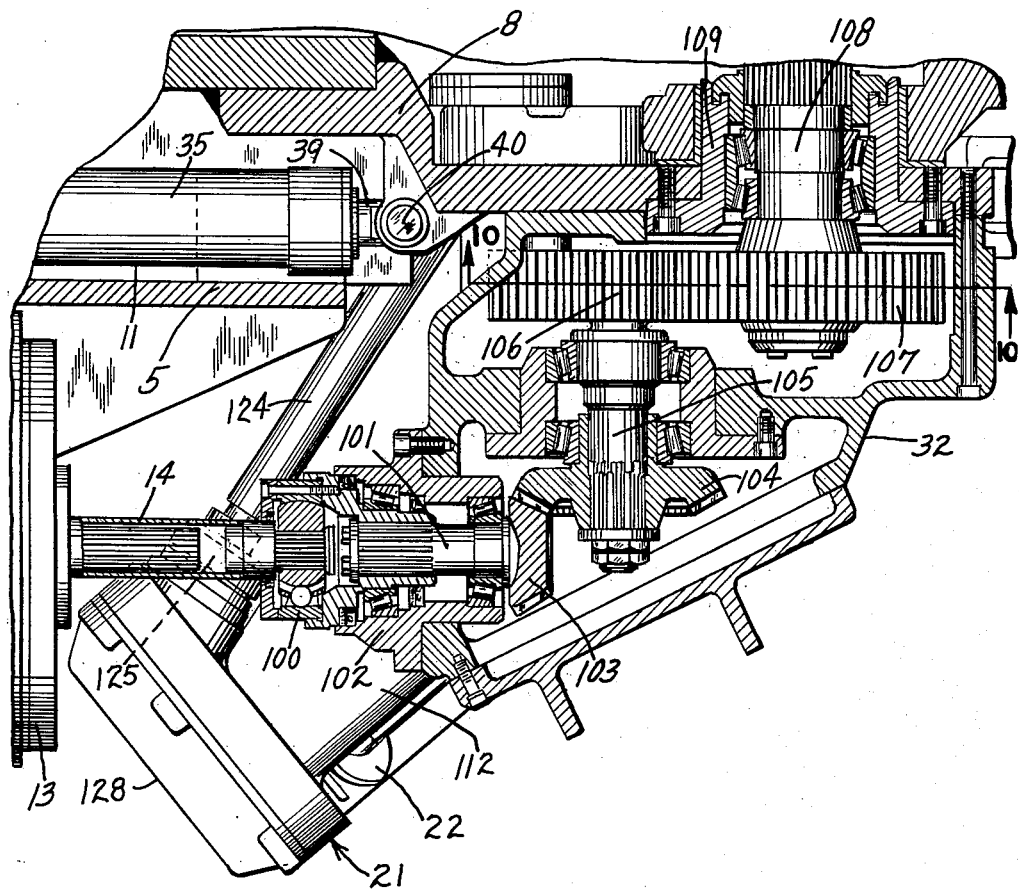

INVENTORS:
WILLIAM G. YOUNG
CHARLES W. FITZGERALD
KENTON E. McELHATTAN

BY Charles F. Osgood,

ATTORNEY

Jan. 7, 1964 W. G. YOUNG ETAL 3,116,914
CONTINUOUS MINING MACHINE HAVING A SINGLE ADJUSTABLE CONVEYOR
Original Filed March 5, 1957 13 Sheets-Sheet 10

INVENTORS:
WILLIAM G. YOUNG
CHARLES W. FITZGERALD
KENTON E. McELHATTAN

BY Charles F. Osgood,

ATTORNEY

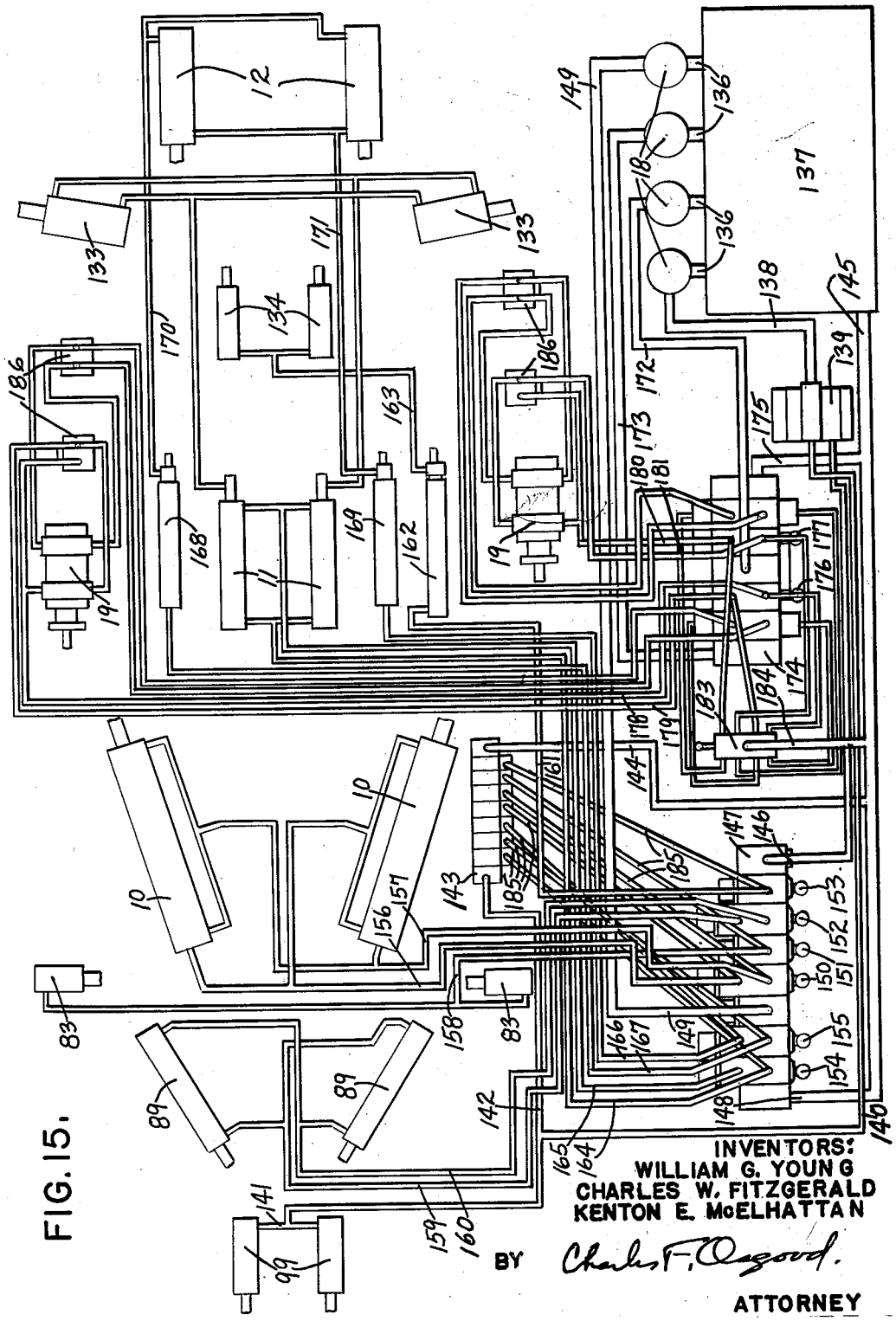

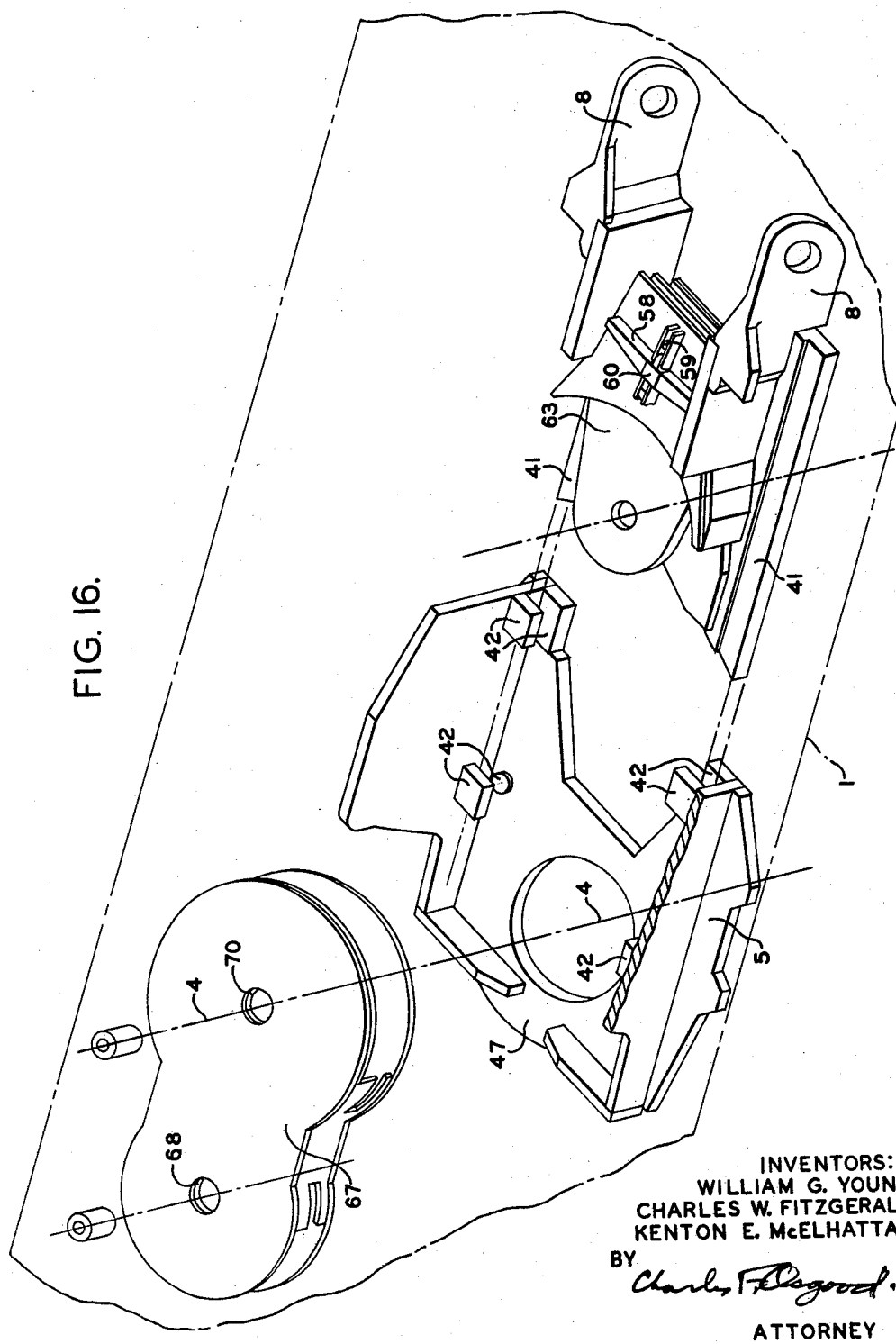

Jan. 7, 1964 W. G. YOUNG ETAL 3,116,914
CONTINUOUS MINING MACHINE HAVING A SINGLE ADJUSTABLE CONVEYOR
Original Filed March 5, 1957 13 Sheets-Sheet 13
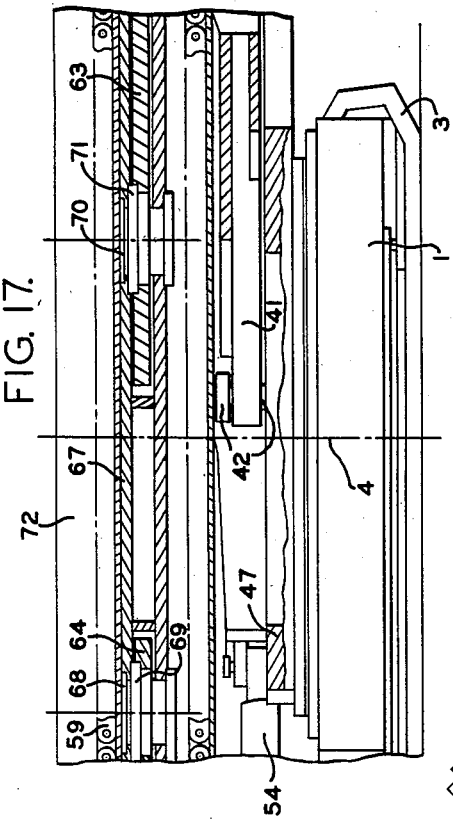
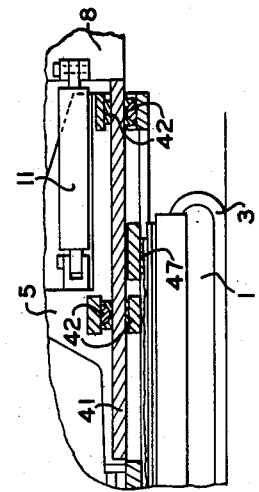
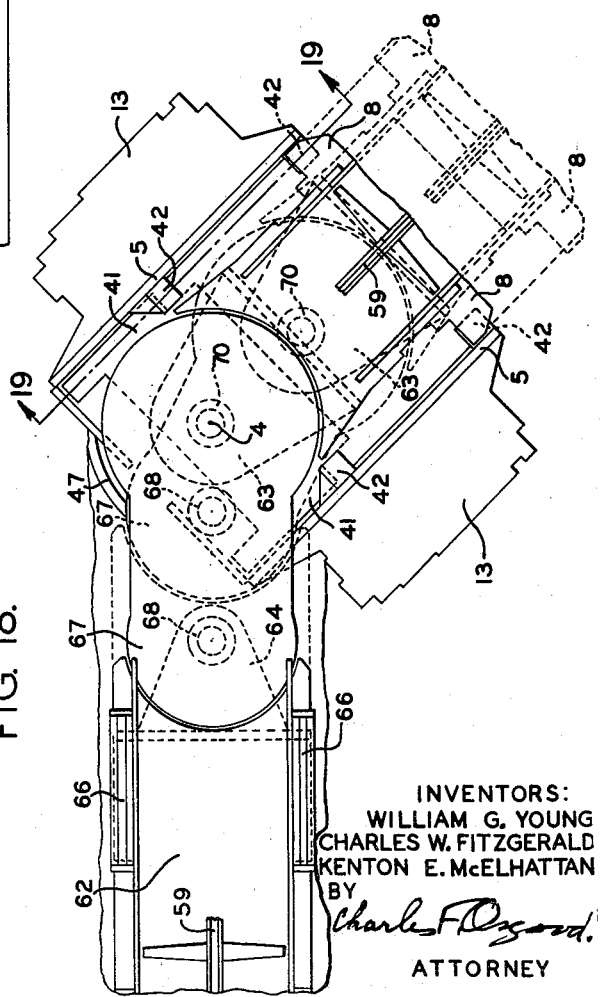
INVENTORS:
WILLIAM G. YOUNG
CHARLES W. FITZGERALD
KENTON E. McELHATTAN
BY
Charles F Osgood
ATTORNEY

United States Patent Office 3,116,914
Patented Jan. 7, 1964

3,116,914
CONTINUOUS MINING MACHINE HAVING A SINGLE ADJUSTABLE CONVEYOR
William G. Young, Stoneboro, and Charles W. Fitzgerald and Kenton E. McElhattan, Franklin, Pa., assignors to Joy Manufacturing Company, Pittsburgh, Pa., a corporation of Pennsylvania
Continuation of application Ser. No. 644,067, Mar. 5, 1957. This application Dec. 10, 1959, Ser. No. 858,821
12 Claims. (Cl. 262—29)

This invention relates to mining machines and more particularly to a continuous miner especially designed for use in the mining of mineral from a solid mine vein and for loading out the dislodged mineral.

This application is a continuation of application Serial No. 644,067, which was filed March 5, 1957, now abandoned.

In a continuous mining machine of the well-known "Joy Miner" type such as is disclosed in the copending Russell and Sibley applications, Serial Nos. 102,995 and 102,996, filed July 5, 1949, now matured into Patents Nos. 2,798,714 and 2,798,713, granted July 9, 1957, a ripper head tears the mineral from a solid mine vein and a conveyor associated with the ripper head receives the dislodged mineral and conveys the dislodged mineral to a hopper located at the pivot of horizontal swinging adjustment of the ripper head. A cooperating conveyor removes the mineral from the hopper and conveys it rearwardly of the machine to a convenient point of delivery. A floor clean-up mechanism is associated with the ripper head for cleaning up any loose mineral which has fallen to the mine floor during the ripping operation.

The present invention contemplates improvements over such earlier machines in that but a single continuous flight conveyor is associated with the ripper head thereby to eliminate any need for a separate front conveyor and hopper arrangement.

An object of the present invention is to provide an improved continuous mining machine. Another object is to provide an improved conveying means for a continuous miner. A further object is to provide an improved double pivot structure associated with the ripper head and conveyor whereby when the ripper head is positioned laterally the conveyor is guided along an arcuate path in an improved manner as the ripper head is advanced toward the work. These and other objects and advantages of the invention will, however, hereinafter more fully appear.

In the accompanying drawings there is shown for purposes of illustration one form which the invention may assume in practice.

In these drawings:

FIGS. 1a and 1b, taken together, constitute a plan view of the improved continuous mining machine.

FIGS. 2a and 2b, taken together, constitute a side elevational view of the mining machine shown in FIGS. 1a and 1b.

FIG. 3 is an enlarged cross section taken on line 3—3 of FIG. 2b, showing the rear conveyor tilt.

FIG. 4 is an enlarged cross section taken on line 4—4 of FIG. 2a, illustrating details of the improved conveyor structure.

Figure 5A:
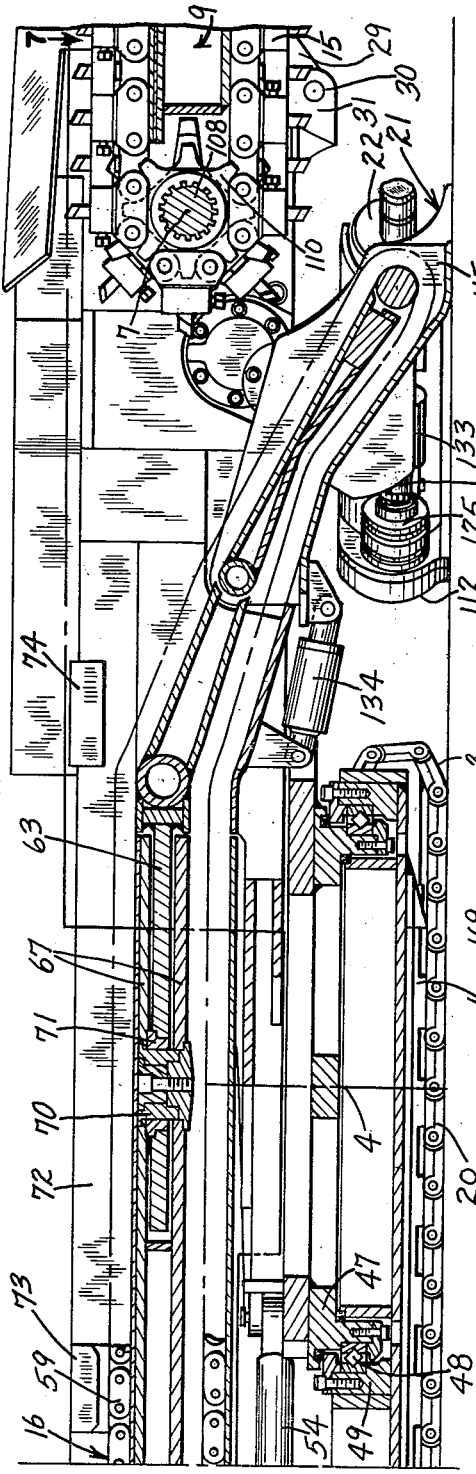

FIGS. 5a, 5b and 5c, taken together, constitute an enlarged central longitudinal vertical section taken on line 5—5 of FIGS. 1a and 1b.

Figure 6:
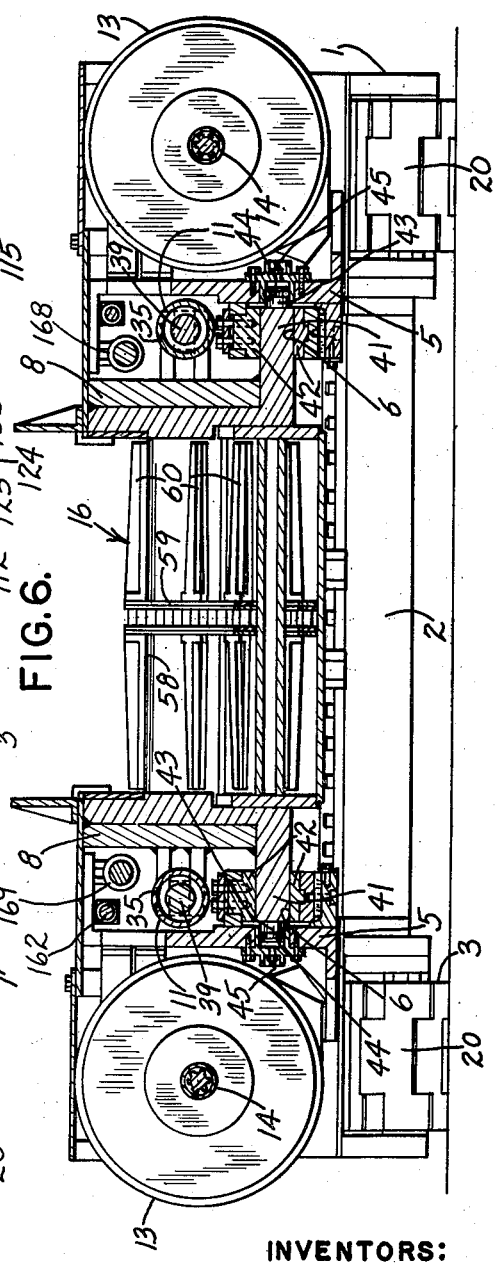

FIG. 6 is an enlarged cross section taken on line 6—6 of FIG. 2a, through the conveyor and showing the head and scroll driving motors.

FIGS. 7a and 7b, taken together, constitute a horizontal section taken on the planes of line 7—7 of FIGS. 5a and 5b.

FIG. 8 is a somewhat diagrammatic plan view, with parts omitted, showing the double pivot arrangement of the front fan section.

FIG. 9 is an enlarged horizontal section taken on line 9—9 of FIG. 2a.

Figure 10:
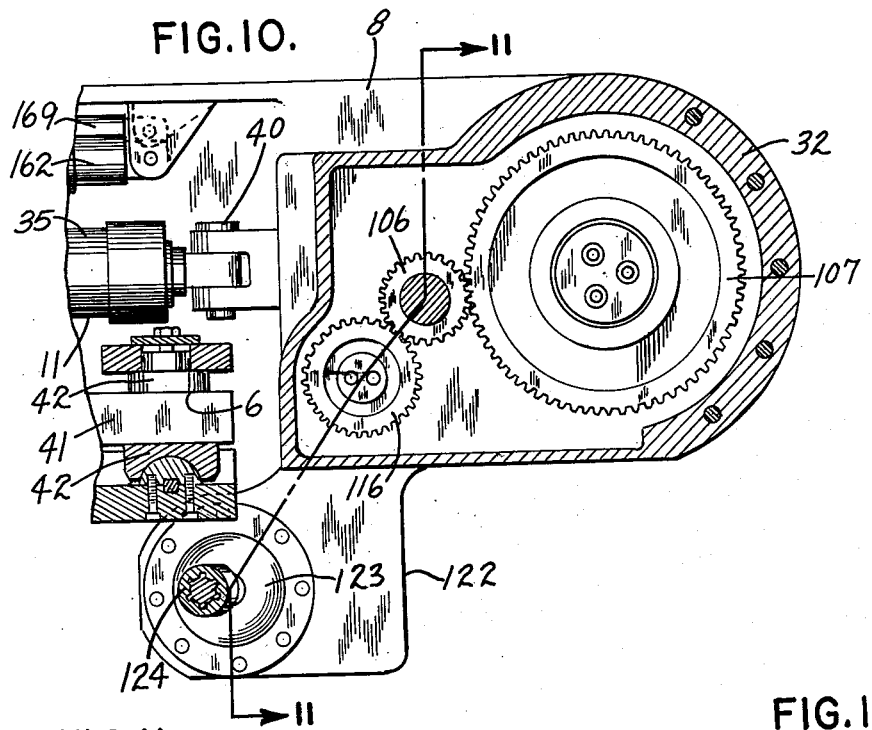

FIG. 10 is a longitudinal vertical section taken on line 10—10 of FIG. 9.

Figure 11:
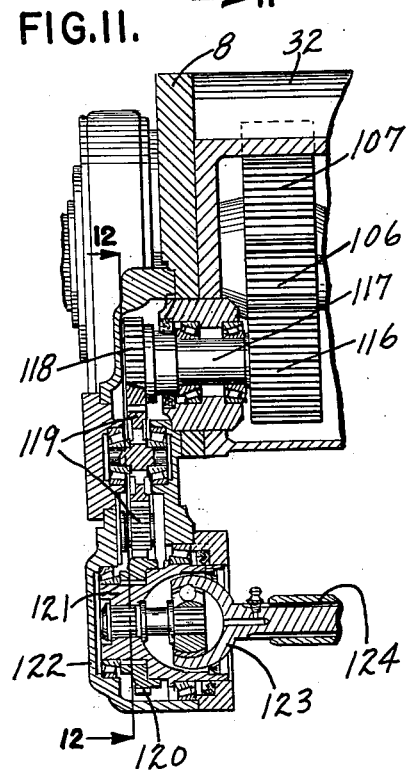

FIG. 11 is a developed cross section taken on line 11—11 of FIG. 10.

Figure 12:
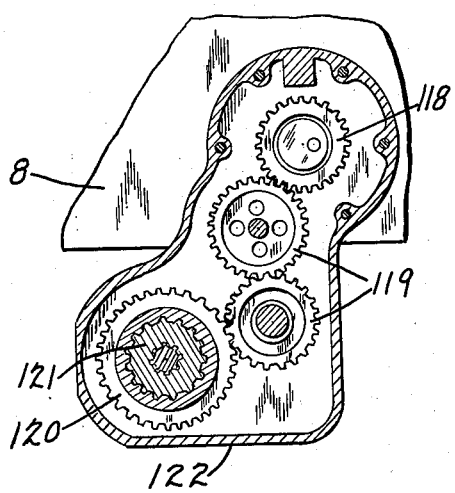

FIG. 12 is a detail section taken on line 12—12 of FIG. 11.

Figure 13:
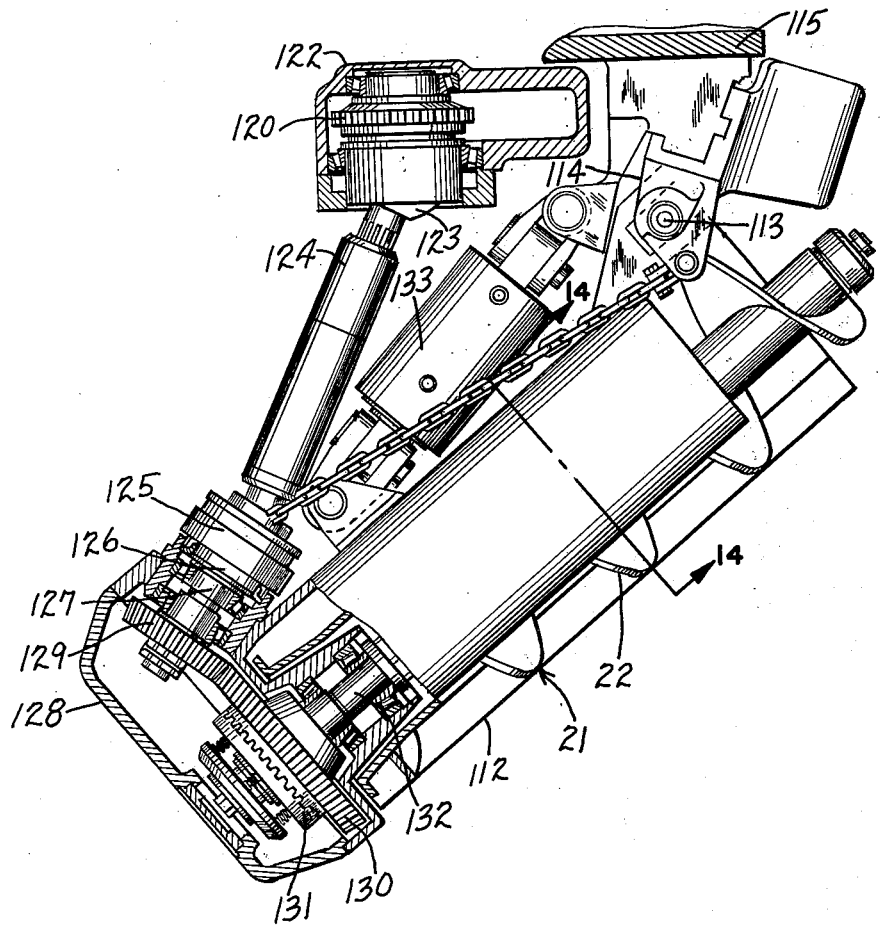

FIG. 13 is an enlarged horizontal section taken on line 13—13 of FIG. 2a, showing one of the conveyor scrolls.

Figure 14:
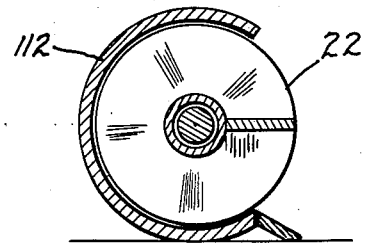

FIG. 14 is a detail cross section taken on line 14—14 of FIG. 13.

FIG. 15 is a diagrammatic view showing the hydraulic fluid system.

FIG. 16 is a fragmentary exploded view of the turntable and flexible conveyor pivotal arrangement.

FIG. 17 is a vertical section taken along cutting plane 5—5 of FIGS. 1a and 1b showing the pivotal axis of the connecting and forward frame displaced from the turntable axis.

FIG. 18 is a partial plan view similar to FIG. 8 again showing the movements of the pivotal points with sumping position in dotted lines.

FIG. 19 is a partial sectional view of FIG. 18 taken along cutting plane 19—19.

The improved continuous miner, as shown in the drawings, generally comprises a mobile base 1 having a frame 2 mounted on self-propelling and steering means 3. Mounted on the base frame to swing horizontally relative thereto about a vertical axis, at 4, is an intermediate swivelled frame 5 provided with horizontal guideways 6 extending in a direction generally radially with respect to the vertical axis 4. Pivotally mounted on a horizontal transverse axis, at 7, on a support 8 slidable along the guideways 6 is a mineral attacking and disintegrating mechanism or so-called ripper head, generally designated 9. Fluid jacks 10 serve to swing the frame 5 horizontally about its pivot 4 while fluid jacks 11 serve to move the sliding support 8 back and forth along the guideways 6. Similar fluid jacks 12 are connected between the sliding support and the swingable ripper head for swinging the latter in vertical planes about its pivot. Motors 13 mounted at the sides of the swivelled frame 5 are operatively connected through telescopic shaftings 14, and associated gearing, as hereinafter described, to the parallel endless disintegrating chains 15 of the ripper head. The mineral dislodged and disintegrated by the head chains is carried rearwardly by the top runs of the disintegrating chains and is discharged onto conveying means, generally designated 16, to be later described more in detail. A motor 17 drives conventional pumping means 18 which supplies fluid under pressure to the several fluid jacks 10, 11 and 12 and to fluid motors 19 which serve to drive the propelling and steering means 3, which are herein desirably endless crawler treads 20. The pumping means also supplies fluid under pressure to the other fluid operated devices of the machine.

Operatively associated with the ripper head is a floor clean-up mechanism, generally designated 21, for gathering loose mineral which has fallen to the mine floor during the ripping operation and for moving the mineral so gathered onto the conveying means. This floor clean-up mechanism includes conveyor scrolls 22 driven through elements of the head drive as will later be more fully described.

The swing jacks 12 for the ripper head are arranged at opposite sides of the swingable head frame 24 and comprise fluid cylinders 25 pivoted at their outer ends at 26 to brackets 27 secured to the sides of the upper portion of the head frame. These cylinders contain pistons 23 having downwardly and rearwardly extending piston rods 29 pivotally connected at 30 to brackets 31 secured to the lower portion of the sliding support 8 at the inner sides of gear housings 32, later referred to, carried by the sliding support. During starting of a cut the ripper head usually has its outer portion positioned at the floor level where it can be sumped into the mine vein, and thereafter the swing cylinders may be operated to swing the head upwardly about its pivot until the outer portion of the head reaches the roof level where the head may be retracted from the vein. The fluid may be trapped in the cylinders to hold the head in adjusted position and the cylinders may be connected to exhaust to permit the head to swing downwardly about its pivot to a new sumping position.

The feeding or sumping jacks 11, as shown in FIGS. 6 and 7a, comprise fluid cylinders 35 pivotally connected at their rear ends at 36 on vertical axes to brackets 37 secured to the swinging frame 5, and reciprocable in these cylinders are pistons 38 having their piston rods 39 pivotally connected at 40 on vertical axes to the sliding support 8 which carries the ripper head. The sliding support 8, as shown in FIG. 6, has lateral guides 41 slidingly guided in adjustable bearing blocks 42 carried by the swivelled frame 5. Pistons 43 guided in transverse bores 44 engage the outer sides of the sliding guides 41 to provide lateral adjustment to compensate for wear and lateral play, and hydraulic fluid, such as grease, may be supplied as by a grease gun to the bores to adjust the pistons. Conventional grease fittings are provided at 45.

The swivel frame 5 is mounted on a turntable 47 (FIG. 5a) rotatably mounted on antifriction bearings 48 carried by an annular portion 49 of the base frame and the vertical axis 4 of the swinging frame is located at the vertical center of this horizontal turntable. The swing jacks 10 for the swinging frame are relatively angularly disposed as shown in FIG. 7b, and comprise fluid cylinders 50 pivotally connected at 51 on vertical axes to a rearwardly located bracket 52 secured to the base frame. These cylinders are swingable horizontally about their pivots and contain reciprocable pistons 53 having their piston rods 54 diverging forwardly and outwardly as shown. The piston rods are pivotally connected at 55 on vertical axes to brackets 56 secured to the swinging frame. Thus, when fluid under pressure is properly supplied to the swing cylinders 50 the frame 5 may be swung horizontally about the turntable axis 4 and by trapping fluid in the cylinders the frame may be held in adjusted position.

Now referring to the improved conveying means 16, it will be noted that an endless flight conveyor 58 has a central drive chain 59 to which lateral conveyor flights 60 are secured and this chain is guided for circulation within trough-like passages 61 and 62 provided respectively by a front conveyor frame 63 carried by the sliding support 8 and a rearward conveyor frame 64 mounted on the base frame, the latter being guided, as shown in FIG. 4, for rectilinear guiding movement longitudinally of the base frame within suitable guideways 65 carried by vertical side plates 66 on the base frame. The rearward sliding conveyor frame 64 is connected to the front conveyor frame 63 by means of a pivoted, horizontal, arm-like frame or connecting link 67. The rearward portion of the connecting frame 67 has a circular bearing member 68 pivotally engaging a bearing sleeve 69 carried by the forward portion of the conveyor frame 64 and the forward portion of the connecting frame carries a circular bearing support 70 pivotally engaging a bearing sleeve 71 carried by the rearward portion of the front conveyor frame 63. It will thus be seen that the connecting frame or link 67 may swing horizontally to provide a double pivot articulation between the front and rear conveyor frames. Flexible vertical side plates 72 are provided at the sides of the conveyor frames therebetween so that the endless conveyor may be guided along an arcuate path when the ripper head is positioned laterally with the swinging frame 5. These flexible side plates are fixed at 73 intermediate their ends to the sides of the connecting frame 67 and the free oppositely extending end portions of these plates are slidingly guided within guide blocks 74 secured to the sides of the front and rear conveyor frames 63 and 64 respectively. The flights of the endless conveyor chain are guided within the trough-like frame passageways 61 and 62 intermediate the flexible side plates and when the ripper head is positioned laterally, as shown in FIG. 8, and the head is advanced radially with respect to the turntable axis, the conveyor chain moves forwardly therewith between the flexible side plates. When the ripper head is moved to its lateral advanced position, as shown in FIG. 8, the connecting frame 67 swings horizontally so that as the conveyor is advanced forwardly with the ripper head the conveyor moves along an arcuate path and the pivotal connecting frome provides a double pivot fan section to facilitate movement of the conveyor chain as it advances along its arcuate path. It is therefore evident that the conveyor may move along the guideways of the base back and forth in unison with the ripper head irrespective of the laterally adjusted position of the latter.

The rearward portion of the conveying means 16 is vertically tiltable and laterally swingable and comprises a tiltable rearward frame portion 76 pivoted at 77 to tilt vertically, and this tiltable rearward portion carries a bearing sleeve 78 engaged by a circular bearing support 79 on which the rearward portion 80 of the tiltable portion 76 of the rear conveyor frame 64 is pivoted at 81 to swing laterally. The rear conveyor frame 64 has lateral side portions 82 on which upright fluid cylinders 83 are pivotally mounted at 84. These fluid cylinders contain reciprocable pistons 85 having upwardly extending piston rods 86 pivotally connected at 87 to brackets 88 secured to the tiltable rear portion 76 of the rear conveyor frame. Fluid jacks 89 (FIGS. 2b and 15) are pivotally connected between the tiltable conveyor frame portion 76 and the swingable rear portion 80 for swinging the latter laterally about its pivot 81. Flexible vertical side plates 90 are secured at 91 to the rear conveyor frame and have their free rearward end portions slidingly guided within guide blocks 92 secured to the rear frame portion 80 and as the rearward portion of the conveyor is swung laterally these flexible side plates bend to provide a curved trough-like passageway 93 within which the endless conveyor chain is guided for movement along an arcuate path.

The rearward portion of the conveyor chain passes around a drive sprocket 94 carried by a movable frame 95 guided within longitudinal guideways 96 (FIG. 2b) for adjustment longitudinally of the rear conveyor frame 80 and drive motors 97 mounted at the sides of the conveyor frames are connected through conventional telescopic shaftings 98 to the drive sprocket 94 so that the latter may be driven irrespective of the adjusted position of the guide frame 95 by which it is carried. Fluid jacks 99 are operatively connected between the rearward frame portion 80 and the guided frame 95 and these cylinders contain pistons having rearwardly extending piston rods 99'. When fluid under pressure is supplied to the jack cylinders 99 the movable frame 95 is constantly urged rearwardly so that proper tension of the conveyor chain is maintained irrespective of the laterally adjusted position of the front and rearward portions of the endless conveyor. This fluid takeup structure is generally like that disclosed in the Seigle and Ziegler application Serial No. 413,120, filed March 1, 1954, now Patent No. 2,856,061, also owned by the assignee of the present invention. The manner in which fluid under pressure is supplied to these takeup cylinders will later become apparent.

As previously mentioned, the endless disintegrating chains 15 of the ripper head are driven by the motors 13 through the telescopic shaft connections 14. As shown in FIG. 9, each of the telescopic shafts 14 is connected at its forward portion through a universal coupling 100 to a longitudinally extending shaft 101 suitably journaled within a bearing bracket 102 carried by the associated gear housing 32. Formed on the shaft 101 is a bevel pinion 103 meshing with and driving a bevel gear 104 keyed to a transverse shaft 105 suitably journaled within the gear housing. Secured to this shaft 105 is a spur pinion 106 (see also FIG. 10) meshing with and driving a large spur gear 107 secured to the adjacent end of a transverse drive shaft 108. This drive shaft is coaxially arranged with the ripper head pivot and is suitably journaled within bearings supported within bearing supports 109 secured to the sliding support 8. Chain sprockets 110 which engage and drive the endless disintegrating chains 15 are keyed to this transverse shaft. It will thus be seen that the disintegrating chains on the ripper head may be driven by both motors 13 through the bevel gearings 103, 104, spur gearings 106, 107, the transverse shaft 108 and chain sprockets 110.

The floor clean-up mechanism 21 for gathering loose mineral which has fallen to the mine floor is associated with the ripper head and this clean-up mechanism comprises housings 112 pivotally mounted at 113 (FIG. 13) on brackets 114 secured to the adjacent sides of a tiltable forward portion 115 on which the forward receiving portion of the endless conveyor is guided. The conveyor scrolls 22 are journaled in these scroll housings and have free inner ends, as shown, and these scrolls are adapted to gather loose mineral on the mine floor and move it inwardly toward the front receiving portion of the endless conveyor, all in the manner fully disclosed in a copending application, Serial No. 542,556, filed October 10, 1955, now Patent No. 2,885,054, owned by the assignee of the present invention.

Now referring to the improved driving means for the conveyor scrolls, it will be noted that arranged within the gear housings 32 at the opposite sides of the front sliding support 8 are spur gears 116 meshing with and driven by the spur pinions 106 of the ripper head drive. The spur gears 116 are secured to a transverse shaft 117 suitably journaled within the gear housings and secured to and driven by these shafts are spur gears 118. Each of the spur gears 118 meshes with and drives through intermeshing spur gears 119 a spur gear 120 secured to a transverse shaft 121 suitably journaled within a gear housing 122 formed integral with the adjacent gear housing 32. Formed integral with this shaft is an element of a universal coupling 123 which is connected through telescopic shafting 124 to a similar universal coupling 125 (FIG. 13). This coupling 125 has an element 126 formed integral with a shaft 127 suitably journaled within a gear housing 128 secured to the outer portion of the adjacent scroll housing. Secured to and driven by the shaft 127 is a gear 129 which meshes with and drives a gear 130 connected through a conventional slip clutch 131 to a shaft 132. Each of the shafts 132 is journaled within bearings supported by the scroll housing and is connected to a scroll for driving the latter. Each of the scrolls is provided with an extensible fluid jack 133 pivotally connected between the rearward portion of the scroll housing and the bracket 114 for swinging the scroll housings horizontally about their pivots. Similar fluid jacks 134 (FIG. 5a) are pivotally connected between the front conveyor frame and the tiltable frame portion 115 for tilting the latter to elevate the scrolls with respect to the mine floor and for holding the scrolls in elevated position during transport. The scroll housings swing forwardly about their pivots as the ripper head is advanced and swing rearwardly as the ripper head is retracted, as disclosed in a copending Russell application Serial No. 524,791, filed July 27, 1955, now Patent No. 2,908,374, likewise owned by the assignee of the present invention.

Now referring to the hydraulic fluid system shown diagrammatically in FIG. 15, it will be noted that the pumping means 18 has suction conduits connected through conduits 136 to a liquid tank 137. The pressure conduit 138 of one of the pump chambers is connected to a conventional flow divider 139 which has a conduit 140 leading to branched conduits 141 connected to the cylinders of the fluid takeup jacks 99 and a branched conduit 142 leads to a relief valve bank 143, the latter having a return conduit 144 connected to a return conduit 145 leading back to the tank. Also extending from the flow divider is a conduit 146 connected to the pressure passage of a valve box 147 of a conventional control valve mechanism. This valve box has a return conduit 148 connected to the discharge conduit 145. Thus the liquid under pressure supplied through the conduit 138 to the flow divider 139 is divided between the conveyor takeup jacks and the valve box 147. The fluid take up embodying the flow divider mechanism is not our invention but is the invention of Carlton B. Frellsen which is claimed in Patent No. 2,895,591, dated July 21, 1959, owned by the assignee of the present invention. A pressure conduit 149 leading from another of the pump chambers is also connected to the pressure passage of the valve box 147. The portion of the valve box 147 which receives its pressure supply from the conduit 146 has bores containing slide valves 150, 151, 152 and 153 while the portion of the valve box receiving its pressure supply through the conduit 149 has bores containing slide valves 154 and 155. The bore containing the valve 150 is connected by conduits 156 and 157 to the cylinders of the swing jacks 10 while the bore containing the slide valve 151 is connected through a conduit 158 to the lift cylinders 83 for the rearward portion of the conveyor. The bore containing the slide valve 152 is connected through conduits 159 and 160 to the opposite ends of the cylinders of the swing jacks 89 for the rearward conveyor portion. The bore containing the slide valve 153 is connected by a conduit 161 to a telescopic conduit device 162 and conduit 163 to the cylinders of the front lift jacks 134 for the forward portion of the conveyor. The bore containing the slide valve 154 is connected by conduits 164 and 165 connected to the opposite ends of the cylinders of the feed or sump jacks 11 while the bore containing the slide valve 155 is connected by conduits 166 and 167 to telescopic conduit devices 168 and 169 and conduits 170 and 171 leading to the opposite ends of the cylinders of the swing jacks 12 for the ripper head. Others of the pump chambers of the pump mechanism are connected through pressure conduits 172 and 173 to sections of a valve box 174 of a conventional control valve mechanism. This valve box is divided into two parts and is provided with a return conduit 175 leading to the discharge conduit 145. These valve box sections have bores containing slide valves 176 and 177 and the bores of these valves are connected by conduits 178, 179 and conduits 180 and 181 leading to hydraulic motors 19 for driving the endless treads of the base propelling and steering means. These motors are reversible and may be operated in either of opposite directions under the control of the slide valves 176 and 177. Also connected to the valve box 174 is a manually shiftable speed selector valve 183 for controlling the speed of the motors 19 and this selector valve is connected by a return conduit 184 to the discharge conduit 145. It will be noted that the several bores for the slide valves 150 to 155 inclusive are connected through conduits 185 to the relief valve bank 143 and certain of the conduits of the hydraulic tread drive motors 19 have conventional relief valves 186.

The general mode of operation of the improved continuous miner is similar to that disclosed in the copending Russell and Sibley applications above referred to. The ripper head 9 may be swung by the swing jacks 10 into different angular positions with respect to the turntable axis 4 and in each position the head may be sumped into the mine vein at the floor level, may be swung upwardly to the roof and may be withdrawn from the vein at the roof level to complete the cut. In the machine of the present invention the conveyor moves along its guideways in unison with the ripper head relative to the base frame in all angularly adjusted positions of the head about the turntable axis 4, thereby eliminating the need for separate front and rear conveyors and an intervening hopper as was present in earlier known machines. As the ripper head is advanced to effect sumping in any of the angular positions of the head and during retraction of the head the connecting link or frame 67 swings horizontally about its pivotal connection with the rear conveyor frame so that the flight conveyor moves along a gradually curving path, the double pivot avoiding an undesirable sharp curve at the point of articulation. As the ripper head advances, the conveyor scrolls of the floor clean-up mechanism 21 are swung forwardly and outwardly by the fluid jacks 133 which are coordinated with the feed jacks 11 and the loose mineral which has fallen to the mine floor during the dislodging operation is gathered by the scrolls and moved onto the forward receiving portion of the conveyor, and as the ripper head is retracted the scrolls are swung back into their retracted position by the fluid jacks 133, all as is fully disclosed in the above mentioned Russell application Serial No. 524,791.

As a result of this invention an improved continuous miner is provided having improved conveying means whereby the loose mineral discharged from the ripper head is conveyed rearwardly of the machine to a convenient point of delivery. By the provision of the double pivot connection between the front and rear portions of the conveyor frames the conveyor is advanced in an improved manner along a curved path irrespective of the lateral angular position of the ripper head with respect to the base. The improved floor clean-up mechanism is driven in a novel manner through elements of the drive gearing for the ripper head chains. By driving the scrolls directly through gearing of the head drive the scrolls are driven in a simplified and more effective manner. These and other advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What we claim as new and desire to secure by Letters Patent is:

1. In combination, a base frame, a turntable carried by said base frame, a frame carried by said turntable providing a guideway extending generally radially with respect to the turntable axis, a support guided for movement along said guideway, a rear conveyor frame guided by a portion of said base frame for movement longitudinally relative thereto, a front conveyor frame carried by and movable with said support, a connecting frame having spaced pivot means is pivotally connected to said front and rear frames respectively whereby said rear frame moves along its guideway as said front frame moves with said support, said connecting frame extending horizontally across the turntable axis and swingable horizontally about its pivotal connection with said rear frame relative to said turntable, and an endless conveyor guided along said front and rear frames and said connecting frame.

2. A combination as set forth in claim 1 wherein means is provided for rotating said turntable to locate said support in different angular positions relative to said base frame, and means for effecting movement of said support along its guideway irrespective of the angular position of said support, said connecting frame swinging about its pivotal connection with said rear frame as said front frame moves with said support along the support guideway.

3. An apparatus for mounting an articulatable disintegrating mechanism for bodily movement, a first support having forward and rearward pivot means located on normal axes with such disintegrating mechanism being connected to said forward pivot means for pivotal movement thereabout, a second support pivotably mounted to the rearward pivot of said first support for relative pivotal movement about said rearward pivot means, support means slidably mounting said first support for relative rectilinear bodily movement thereon, means for mounting said support means on a mobile base for pivotal movement about an axis parallel to said rearward pivot means, and a third support slidably mounted on guide means secured to said mobile base with said third support being pivotally connected to said second support for movement therewith.

4. An apparatus for mounting an articulatable disintegrating mechanism for bodily movement, a first support having a forward and rearward pivot means located on a normal axes with such disintegrating mechanism being connected to said forward pivot means for pivotal movement thereabout, a second support pivotably mounted to the rearward pivot of said first support for relative pivotal movement about said rearward pivot means, means slidably mounting said first support for rectilinear bodily movement thereon, means for mounting said last mentioned means for pivotal movement about an axis parallel to said rearward pivot means, said second mentioned mounting means being located on the forward portion of an elongated main frame, means for moving said first support relative to said first mentioned slidable mounting means, a third support slidably mounted on guide means secured to said main frame, said third support being pivotally connected to said second support for bodily movement therewith, and an endless flight conveyor means guided for circulation along said first support said second support and said third support.

5. A mining apparatus comprising, an elongated main frame having a forward pivot means, a turntable mounted on said frame having pivot means thereon operatively connected to said forward pivot means of said main frame for pivotal movement in a horizontal plane, means on said turntable for receiving rectilinear guides, a mining head support having a forward and rearward pivot means located on normal axes respectively, means on said support for operatively engaging said rectilinear guides for allowing said support to be reciprocable relative to said turntable, a connecting frame having a forward and a rearward pivot means with the forward pivot means pivotally connected to the rearward pivot of said support to permit relative pivotal movement therebetween in a horizontal plane, a mineral disintegrating mechanism pivotally connected to the forward pivot means of said support for pivotal movement about a horizontal axis, an elongated rearward support guided by guide means for said main frame, said rearward support having a forward pivot means pivotally connected to said rearward pivot means of said connecting frame for relative horizontal pivotal movement with respect thereto, and means for bodily moving said support and said connecting frame and said rearward support relative to said main frame and relative to said turntable.

6. A mining machine comprising a mobile base having a frame rotatably mounted thereon about a first vertical axis; means mounted on said base operatively connected to said frame for swinging said frame about said first axis; an elongated support member slidably mounted on said frame for reciprocable movement thereon; said support member having a forward portion and a rearward portion; means mounted on said frame operatively connected to said support member for moving said support member relative to said frame; a power disintegrating head mounted on said forward portion of said support member; an elongated conveyor means connected to said support member for movement therewith; said elongated conveyor means having a front portion, an intermediate portion, and a rear portion; said intermediate portion of said conveyor means being pivotally connected respectively to said front portion and said rear portion of said conveyor means, said front portion of said conveyor means being carried by said support member while said rear portion of said conveyor means being slidably guided by an extension from said base, whereby the extension of said support member after pivotal movement of said frame extends the support member and the said conveyor means therewith.

7. A combination as set forth in claim 6 wherein said intermediate portion of said conveyor is in the form of an elongated connecting link providing the sole connection between said front and rear conveyor portions whereby said front portion moves said rear portion through said connecting link.

8. A combination as set forth in claim 7 wherein said conveyor frames have trough-like passageways in which said conveyor travels and said connecting link underlies the bottoms of said passageways.

9. A combination as set forth in claim 8 wherein said trough-like passageways have flexible sidewalls extending above and close to said connecting link and said sidewalls moving horizontally over said connecting link as said front conveyor frame swings horizontally.

10. A continuous miner comprising, in combination, a base frame having a fixed vertical pivot axis thereon, a swivel frame mounted on said base frame to swing horizontally about said vertical pivot axis, said swivel frame having elongated guideways extending horizontally thereon, a support frame mounted on said swivel frame and swingable bodily horizontally therewith and having guides cooperative with said guideways for longitudinal movement of said support frame relative to said swivel frame, a front conveyor frame carried by said support frame for bodily movement therewith, a vein attacking and disintegrating mechanism connected to said support frame, a rear conveyor frame supported and guided by a rearwardly extending portion of said base frame, a connecting frame having a forward pivot connection with said front conveyor frame for movement bodily therewith, said connecting frame having a rear pivot connection with said rear conveyor frame for moving said rear conveyor frame bodily with said connecting frame, said support frame when moved longitudinally relative to said swivel frame moving with it said front conveyor frame, said connecting frame and said rear conveyor frame, said support frame when so moved aforesaid and swung horizontally with said swivel frame about said vertical pivot axis causes a change in the relative position between said connecting frame and said front conveyor frame about the forward pivot connection and causes a change in the relative position between said connecting frame and said rear conveyor frame about the rear pivot connection and also causes a change in the relative lateral location of the forward pivot connection with respect to the rear pivot connection, and an endless conveyor guided for circulation along said conveyor frame and said connecting frame.

11. A continuous miner as set forth in claim 10 wherein means are provided for moving said support along its guideway, and flexible side frame retaining means is provided on said connecting frame which cooperates with said front and rear conveyor frames for guiding said conveyor as it moves along a curved path relative to said connecting frame.

12. A continuous miner comprising in combination, a base frame, an intermediate frame oscillatable about a fixed pivot axis on said base frame, a support frame reciprocably mounted for bodily longitudinal movement on said intermediate frame, a vein attacking and disintegrating mechanism pivotally connected to said support frame to swing vertically about a horizontal axis on said support frame, a conveyor guide frame secured to said support frame for bodily movement with said support frame, an arm-like frame in the form of a link pivotally connected at one end to said conveyor guide frame and bodily movable longitudinally therewith, a cooperable conveyor guide frame pivotally connected to the other end of said link and longitudianlly bodily movable, similarly and in response to, the longitudinal movement of said first mentioned guide frame and said link, and guide means mounted on said base frame operatively engaging said cooperable conveyor guide frame.

References Cited in the file of this patent
UNITED STATES PATENTS

| | | |
|---|---|---|
| 1,231,495 | Cleaver et al. | June 26, 1917 |
| 1,431,857 | Willcox | Oct. 10, 1922 |
| 2,210,655 | Doberstein | Aug. 6, 1940 |
| 2,287,230 | Cartlidge | June 23, 1942 |
| 2,338,704 | Clarkson et al. | Jan. 11, 1944 |
| 2,665,794 | Slomer | Jan. 12, 1954 |
| 2,743,967 | Lappe | May 1, 1956 |
| 2,788,201 | Lindgren et al. | Apr. 9, 1957 |
| 2,792,204 | Cartlidge | May 14, 1957 |
| 2,798,714 | Russell | July 9, 1957 |